United States Patent
Yamagami

(10) Patent No.: US 9,712,533 B2
(45) Date of Patent: Jul. 18, 2017

(54) NOTIFYING UNAUTHORIZED USE OF ELECTRONIC DEVICE DURING DISCONNECTION TIME PERIOD OF ELECTRONIC DEVICE FROM NETWORK

(71) Applicant: KYOCERA Document Solutions Inc., Osaka (JP)

(72) Inventor: Hiromi Yamagami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 63 days.

(21) Appl. No.: 14/812,688

(22) Filed: Jul. 29, 2015

(65) Prior Publication Data

US 2016/0036820 A1 Feb. 4, 2016

(30) Foreign Application Priority Data

Jul. 30, 2014 (JP) .................................. 2014-154528

(51) Int. Cl.
   *H04L 29/06* (2006.01)
(52) U.S. Cl.
   CPC ............ *H04L 63/10* (2013.01); *H04L 63/108* (2013.01); *H04L 63/1416* (2013.01); *H04N 2201/0094* (2013.01)
(58) Field of Classification Search
   CPC .... H04L 63/10; H04L 63/108; H04L 63/1416
   USPC ......................................................... 726/26
   See application file for complete search history.

(56) References Cited

U.S. PATENT DOCUMENTS

| 9,213,810 | B2* | 12/2015 | Nakajima | G06F 21/552 |
| | | | | 726/4 |
| 2003/0204747 | A1* | 10/2003 | Gaebel | G06F 21/608 |
| | | | | 726/26 |
| 2007/0143824 | A1* | 6/2007 | Shahbazi | H04L 63/083 |
| | | | | 726/1 |
| 2007/0150738 | A1* | 6/2007 | Kawai | G06F 21/33 |
| | | | | 713/176 |
| 2007/0220605 | A1* | 9/2007 | Chien | G06F 21/552 |
| | | | | 726/23 |
| 2008/0043938 | A1* | 2/2008 | Yasuda | H04M 1/6505 |
| | | | | 379/88.08 |
| 2008/0072289 | A1* | 3/2008 | Aoki | H04L 43/0811 |
| | | | | 726/3 |

(Continued)

FOREIGN PATENT DOCUMENTS

JP 2000-330663 A 11/2000
JP 2007-114889 A 5/2007

*Primary Examiner* — Haresh N Patel
(74) *Attorney, Agent, or Firm* — Stein IP, LLC

(57) ABSTRACT

A device management apparatus for notifying unauthorized use of an electronic device includes a connection status detecting circuit, a usage log acquiring circuit, and a notification circuit. The connection status detecting circuit detects a connection status of the electronic device to a network. The usage log acquiring circuit acquires a usage log of the electronic device. The notification circuit notifies an unauthorized use of the electronic device. The notification circuit notifies the unauthorized use if the usage logs acquired by the usage log acquiring circuit before and after a time period of disconnection of the electronic device from the network are varied, a reconnection of the electronic device to the network being detected by the connection status detecting circuit.

15 Claims, 5 Drawing Sheets

(56) References Cited

U.S. PATENT DOCUMENTS

| | | | | |
|---|---|---|---|---|
| 2008/0189781 | A1* | 8/2008 | Pathak | H04L 12/24 726/12 |
| 2008/0231895 | A1* | 9/2008 | Yamazaki | H04N 1/00347 358/1.15 |
| 2010/0110497 | A1* | 5/2010 | Ohmiya | H04N 1/32138 358/3.28 |
| 2011/0075179 | A1* | 3/2011 | Utsumi | G06F 21/31 358/1.13 |
| 2011/0129074 | A1* | 6/2011 | Kunii | H04L 12/40013 379/93.01 |
| 2011/0129075 | A1* | 6/2011 | Yamane | H04N 1/00347 379/100.15 |
| 2011/0145658 | A1* | 6/2011 | Wasamoto | G06F 21/79 714/47.1 |
| 2011/0157633 | A1* | 6/2011 | Hiruma | G06F 21/6245 358/1.15 |
| 2011/0222102 | A1* | 9/2011 | Ito | H04N 1/00204 358/1.14 |
| 2011/0231922 | A1* | 9/2011 | Azuma | G06F 21/35 726/9 |
| 2011/0313896 | A1* | 12/2011 | Nuggehalli | G06K 9/00993 705/30 |
| 2012/0046859 | A1* | 2/2012 | Imes | G05D 23/1905 701/409 |
| 2012/0084349 | A1* | 4/2012 | Lee | G06Q 30/02 709/203 |
| 2012/0101952 | A1* | 4/2012 | Raleigh | G06Q 30/016 705/304 |
| 2012/0110200 | A1* | 5/2012 | Ahn | G06F 19/327 709/230 |
| 2012/0176636 | A1* | 7/2012 | Ormond | G03G 15/5079 358/1.13 |
| 2012/0236345 | A1* | 9/2012 | Machida | G06F 9/4408 358/1.13 |
| 2013/0051692 | A1* | 2/2013 | Kakutani | H04N 1/32133 382/233 |
| 2013/0132854 | A1* | 5/2013 | Raleigh | G06F 3/0482 715/738 |
| 2013/0321832 | A1* | 12/2013 | Sugiyama | H04N 1/00029 358/1.13 |
| 2014/0179317 | A1* | 6/2014 | Tanaka | H04W 60/00 455/435.2 |
| 2014/0280889 | A1* | 9/2014 | Nispel | H04L 43/04 709/224 |
| 2014/0331284 | A1* | 11/2014 | Keohane | H04W 12/08 726/4 |
| 2015/0026186 | A1* | 1/2015 | Ewer | G06F 17/3092 707/741 |
| 2015/0052443 | A1* | 2/2015 | Funase | G06F 3/0484 715/736 |
| 2015/0347884 | A1* | 12/2015 | Kodimer | G06F 3/1285 358/1.13 |

* cited by examiner

| Identification Information of MFP | Print Counter Value |
|---|---|
| MFP001 | 13572 |
| MFP002 | 9459 |
| MFP003 | 33472 |
| ... | ... |

| Date and Time | Connection/ Disconnection | Identification Information of MFP |
|---|---|---|
| . . . | . . . | . . . |
| 2014/7/31/9:00 | Connection | MFP001 |
| . . . | . . . | . . . |
| 2014/7/31/18:00 | Disconnection | MFP001 |
| . . . | . . . | . . . |

NOTIFYING UNAUTHORIZED USE OF ELECTRONIC DEVICE DURING DISCONNECTION TIME PERIOD OF ELECTRONIC DEVICE FROM NETWORK

INCORPORATION BY REFERENCE

This application is based upon, and claims benefit of priority from corresponding Japanese Patent Application No. 2014-154528, filed in the Japanese Patent Office on Jul. 30, 2014, the entire contents of which are incorporated herein by reference.

BACKGROUND

Unless otherwise indicated herein, the description in this section is not prior art to the claims in this application and is not admitted to be prior art by inclusion in this section.

As a device management method for controlling an electronic device, there is known a technique that detects whether or not the electronic device is connected to a network.

SUMMARY

A device management apparatus for notifying unauthorized use of an electronic device according to an aspect of the disclosure includes a connection status detecting circuit, a usage log acquiring circuit, and a notification circuit. The connection status detecting circuit detects a connection status of the electronic device to a network. The usage log acquiring circuit acquires a usage log of the electronic device. The notification circuit notifies an unauthorized use of the electronic device. The notification circuit notifies the unauthorized use if the usage logs acquired by the usage log acquiring circuit before and after a time period of disconnection of the electronic device from the network are varied, a reconnection of the electronic device to the network being detected by the connection status detecting circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
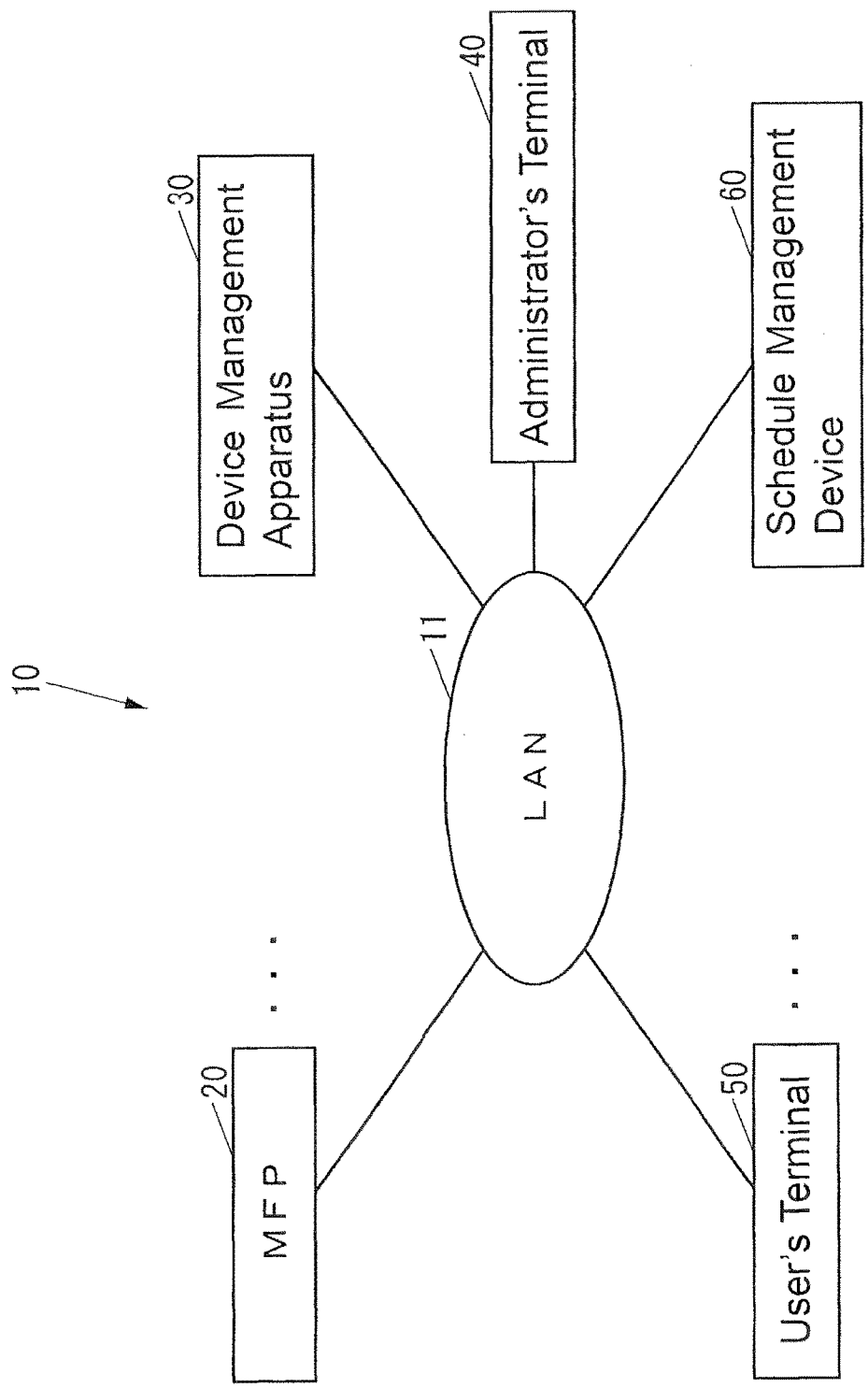
FIG. 1 illustrates a device management system according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the accompanying drawings.

First, a description will be given of a configuration of a device management system 10 according to the embodiment.

FIG. 1 illustrates the device management system 10 according to the embodiment.

As illustrated in FIG. 1, the device management system 10 includes a plurality of Multifunction Peripherals (MFP) 20 as an electronic device, a device management apparatus 30, an administrator's terminal 40, a plurality of user's terminals 50, and a schedule management device 60. The device management apparatus 30 controls the plurality of MFPs 20. The administrator's terminal 40 is used by an administrator of the MFPs 20. The plurality of user's terminals 50 are used by users of the MFPs 20. The schedule management device 60 ensures a schedule management system for controlling schedules of the users of the MFP 20.

The device management apparatus 30, the administrator's terminal 40, the plurality of user's terminals 50, and the schedule management device 60 are constituted of respective computers, such as a Personal Computer (PC).

The plurality of MFPs 20, the device management apparatus 30, the administrator's terminal 40, the plurality of user's terminals 50, and the schedule management device 60 are communicatively connected with one another via a Local Area Network (LAN) 11 as a network. In addition, the device management apparatus 30, the administrator's terminal 40, the plurality of user's terminals 50, and the schedule management device 60 may be connected to the LAN 11 via the Internet.

The plurality of MFPs 20 each store a print counter value indicating a count of print execution in itself.

Hereinafter, assume that the plurality of MFPs 20 are installed within the same company. Further, assumes that the users of the MFPs 20 are employees of the company where the MFPs 20 are installed (hereinafter simply referred to as "company").

The schedule management system achieved by the schedule management device 60 includes a calendar function such as "Google (registered trademark) Calendar" and "MICROSOFT OFFICE (registered trademark) calendar."

The schedule management system achieved by the schedule management device 60 may set holidays of the company and time slots of out-of-business hours for the respective users of the MFPs 20. Furthermore, the users of the MFPs 20 can register users' own schedules in the schedule management system by access to the schedule management system in the schedule management device 60 via the user's terminal 50.

Figure 2:
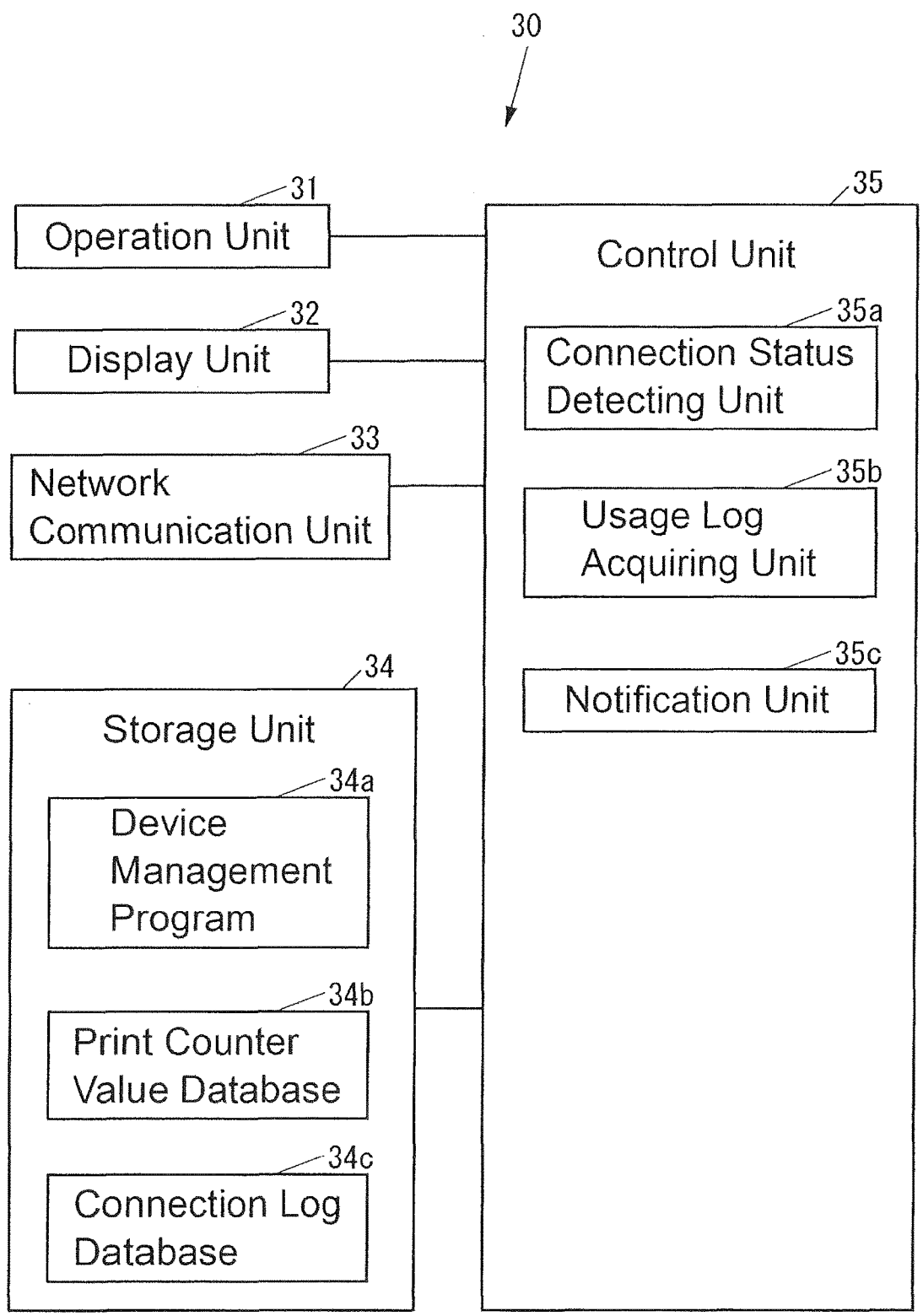
FIG. 2 illustrates a device management apparatus according to the embodiment.

FIG. 2 illustrates the device management apparatus 30.

As illustrated in FIG. 2, the device management apparatus 30 includes an operation unit 31, a display unit 32, a network communication unit 33, a storage unit 34, and a control unit 35 that controls the whole device management apparatus 30. The operation unit 31 is an input device such as a mouse and a keyboard, with which various operations are input. The display unit 32 is a display device such as a Liquid Crystal Display (LCD), which displays various pieces of information. The network communication unit 33 is a network communication device that communicates with an external device via the LAN 11 (see FIG. 1). The storage unit 34 is a non-volatile storage device such as a Hard Disk Drive (HDD) that stores programs and various kinds of data.

The storage unit 34 stores a device management program 34a for controlling the MFPs 20. The device management program 34a may be installed to the device management apparatus 30 at production stage of the device management apparatus 30, or may be additionally installed to the device management apparatus 30 from a storage medium such as a Compact Disk (CD), a Digital Versatile Disk (DVD), and a Universal serial Bus (USB) memory, or may be additionally installed to the device management apparatus 30 on the LAN 11.

Additionally, the storage unit 34 can store a print counter value database 34b including the print counter values of the respective MFPs 20.

Figure 3:
FIG. 3 illustrates an exemplary print counter value database according to the embodiment.

FIG. 3 illustrates the exemplary print counter value database 34b.

As illustrated in FIG. 3, the print counter value database 34b includes a combination of the identification information and the print counter value of the MFP 20 for each of the MFPs 20. In the print counter value database 34b illustrated in FIG. 3, for example, the print counter value of the MFP 20 with the identification information of "MFP001" is "13572."

As illustrated in FIG. 2, the storage unit 34 can store a connection log database 34c that includes a connection log of the MFP 20 to the LAN 11.

Figure 4:
FIG. 4 illustrates an exemplary connection log database according to the embodiment.

FIG. 4 illustrates the exemplary connection log database 34c.

As illustrated in FIG. 4, the connection log database 34c includes combinations of: date and time of connection of the MFP 20 to the LAN 11 or disconnection of MFP 20 from the LAN 11; distinction of the connection of the MFP 20 to the LAN 11 or the disconnection of MFP 20 from the LAN 11; and identification information of the MFPs 20, as the connection log of the MFPs 20 to the LAN 11. In the connection log database 34c illustrated in FIG. 4, for example, the MFP 20 with the identification information of "MFP001" was connected to the LAN 11 at 9:00 on Jul. 31, 2014, and was disconnected from the LAN 11 at 18:00 on Jul. 31, 2014.

The control unit 35 illustrated in FIG. 2, for example, is a processor that includes a Central Processing Unit (CPU), a Read Only Memory (ROM) storing programs and various kinds of data, and a Random Access Memory (RAM) to be used as a work area of the CPU. The CPU can execute the programs stored in the ROM that is a non-transitory computer-readable recording medium and the storage unit 34.

The control unit 35 executes the device management program 34a stored in the storage unit 34 to function as a connection status detecting unit 35a, a usage log acquiring unit 35b, and a notification unit 35c. The connection status detecting unit 35a is a connection status detecting circuit that detects a connection status of the MFPs 20 to the LAN 11. The usage log acquiring unit 35b is a usage log acquiring circuit that acquires the print counter values as a usage log of the MFPs 20. The notification unit 35c is a notification circuit that notifies unauthorized use of the MFPs 20.

Furthermore, when the MFP 20 is taken out outside the company, the connection status detecting unit 35a can detect the disconnection of the MFP 20 from the LAN 11 because the MFP 20 taken out of the company is disconnected from the LAN 11.

Next, a description will be given of operation of the device management system 10.

Figure 5:
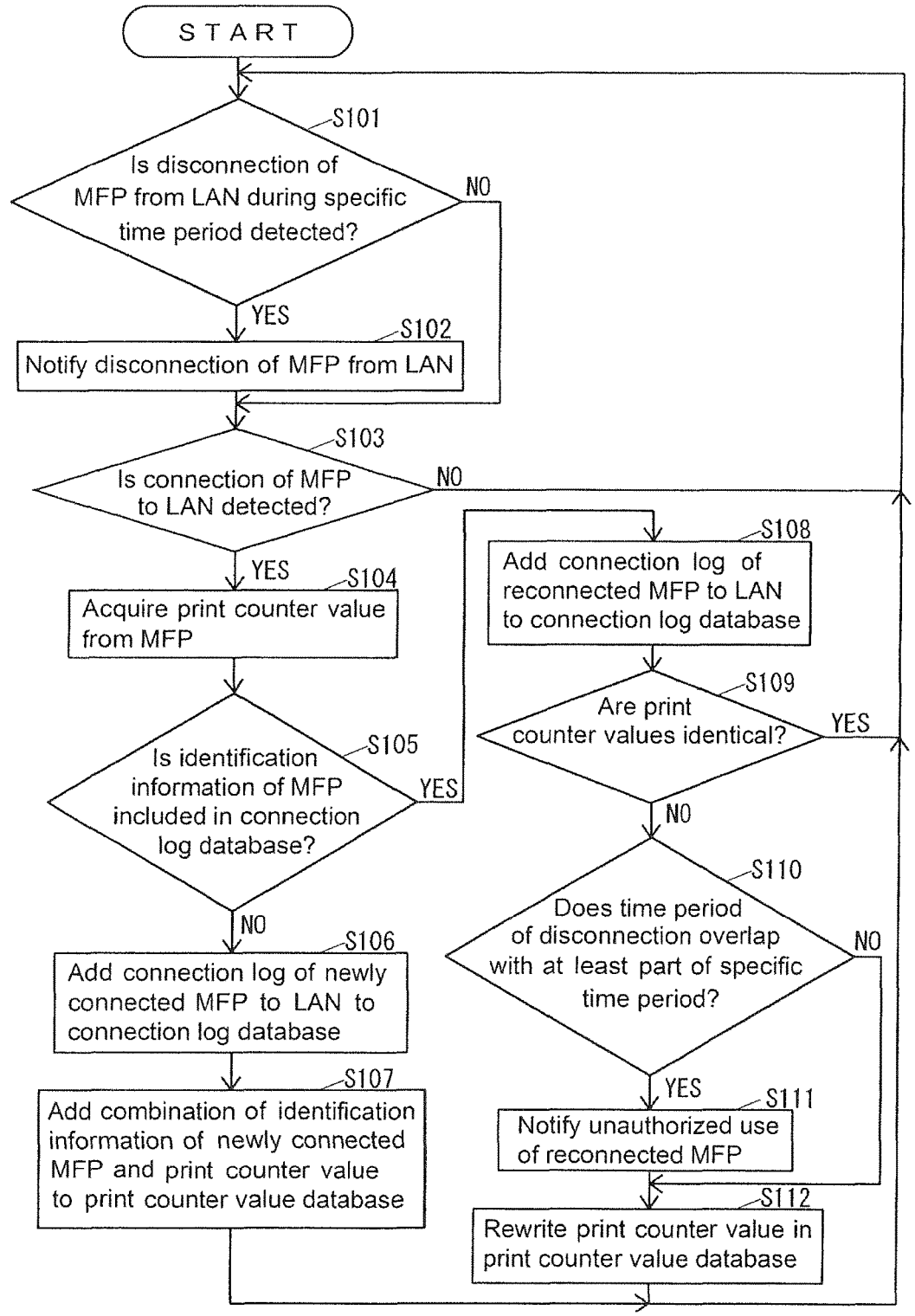
FIG. 5 illustrates an operation of the device management apparatus according to the embodiment.

FIG. 5 illustrates the operation of the device management apparatus 30.

As illustrated in FIG. 5, the connection status detecting unit 35a of the device management apparatus 30 determines whether or not the disconnection of the MFP 20 from the LAN 11 is detected during a specific time period via the network communication unit 33 (Step S101). Here, the specific time period is a time period that the connection status detecting unit 35a determines as the time period when the MFP 20 is less likely to be used, based on the schedule acquired from the schedule management system. Accordingly, the use of the MFP 20 during the specific time period has the possibility of the unauthorized use of the MFP 20. That is, the specific time period is the period when the possibility of the unauthorized use of the MFP 20 is high. The specific time period, for example, includes company holidays and the time slots of out-of-business hours for the respective users of the MFPs 20.

When the disconnection of the MFP 20 from the LAN 11 during the specific time period is determined at the Step S101, the notification unit 35c notifies an administrator of the disconnection of the MFP 20 from the LAN 11 along with the identification information of the MFP 20 disconnected from the LAN 11 at the e-mail address by e-mail via the network communication unit 33 (Step S102). Accordingly, the administrator can recognize which one of the MFPs 20 is disconnected from the LAN 11 by reception of the e-mail from the device management apparatus 30 by, for example, the administrator's terminal 40.

When the connection status detecting unit 35a determines that the disconnection of the MFP 20 from the LAN 11 during the specific time period is not detected at Step S101, or a process of Step S102 is terminated, the connection status detecting unit 35a determines whether or not the connection of the MFP 20 to the LAN 11, which was unconnected to the LAN 11, is detected via the network communication unit 33 (Step S103).

When it is determined that the connection of the MFP 20 to the LAN 11, which was unconnected to the LAN 11, is detected at Step S103, the usage log acquiring unit 35b acquires the current print counter value of the MFP 20 from the MFP 20 the status of which is changed from the disconnection to the connection to the LAN 11 via the network communication unit 33 (Step S104).

Next, the connection status detecting unit 35a determines whether or not the identification information of the MFP 20 the status of which is changed from the disconnection to the connection to the LAN 11 is included in the connection log database 34c (Step S105). Here, inclusion of the identification information of the MFP 20 the status of which is changed from the disconnection to the connection to the LAN 11 in the connection log database 34c means that the MFP 20 the status of which is changed from the disconnection to the connection to the LAN 11 is reconnected to the LAN 11. On the other hand, no inclusion of the identification information of the MFP 20 the status of which is changed from the disconnection to the connection to the LAN 11 in the connection log database 34c means that the MFP 20 the status of which is changed from the disconnection to the connection to the LAN 11 is first connected to the LAN 11.

When the connection status detecting unit 35a determines that the identification information of the MFP 20 is not included in the connection log database 34c at Step S105, the connection status detecting unit 35a adds the connection log of the MFP 20 to the LAN 11, where the MFP 20

(hereinafter referred to as a "newly connected MFP 20") is first connected to the LAN 11, to the connection log database 34*c* (Step S106).

Next, the usage log acquiring unit 35*b* adds a combination of the print counter value acquired at Step S104 and the identification information of the newly connected MFP 20 to the print counter value database 34*b* (Step S107).

When the connection status detecting unit 35*a* determines that the identification information of the MFP 20 is included in the connection log database 34*c* at Step S105, the connection status detecting unit 35*a* adds the connection log of the MFP 20 to the LAN 11, where the MFP 20 (hereinafter referred to as a "reconnected MFP 20") is reconnected to the LAN 11, to the connection log database 34*c* (Step S108).

Next, the usage log acquiring unit 35*b* determines whether or not the print counter value, which is included in the print counter value database 34*b* combined with the identification information of the reconnected MFP 20, and the print counter value acquired at Step S104 are identical (Step S109).

When the usage log acquiring unit 35*b* determines that these two print counter values are not identical at Step S109, the connection status detecting unit 35*a* determines whether or not the time period during the disconnection of the reconnected MFP 20 from the LAN 11 overlaps with at least a part of the specific time period (Step S110). Here, the specific time period is the time period that the connection status detecting unit 35*a* determines as the time period when the MFP 20 is less likely to be used, based on the schedule acquired from the schedule management system, and is the time period that is identical with the time period at Step S101.

When the connection status detecting unit 35*a* determines that the time period during the disconnection of the reconnected MFP 20 from the LAN 11 overlaps with at least a part of the specific time period at Step S110, the notification unit 35*c* notifies the administrator of the unauthorized use of the reconnected MFP 20 along with the identification information of the reconnected MFP 20 at the e-mail address by e-mail via the network communication unit 33 (Step S111). Accordingly, the administrator can recognize which one of the MFPs 20 was unauthorizedly used by the reception of the e-mail from the device management apparatus 30 by, for example, the administrator's terminal 40.

When the connection status detecting unit 35*a* determines that the time period during the disconnection of the reconnected MFP 20 from the LAN 11 does not overlap with the specific time period at all at Step S110, or the process of Step S111 terminates, the usage log acquiring unit 35*b* overwrite the print counter value, which is combined with the identification information of the reconnected MFP 20 in the print counter value database 34*b*, with the print counter value acquired at Step S104 (Step S112).

When the connection status detecting unit 35*a* determines that the connection of the MFP 20 to the LAN 11, which was unconnected to the LAN 11, is not detected at Step S103, or the process of Step S107 is terminated, or the usage log acquiring unit 35*b* determines that two print counter values are identical at Step S109, or the process of the Step S112 is terminated, the connection status detecting unit 35*a* executes the process of Step S101.

As described above, since the device management apparatus 30 notifies the unauthorized use of the MFP 20 (Step S111) when the reconnection of the MFP 20 to the LAN 11 is detected (YES at Step S103 and YES at Step S105) and the print counter value of the MFP 20 is changed during the time period of the disconnection of the MFP 20 from the LAN 11 (NO at Step S109), the device management apparatus 30 can notify the unauthorized use of the MFP 20 during the time period of the disconnection of the MFP 20 from the LAN 11. Accordingly, the device management apparatus 30 ensures prevention of the unauthorized use of the MFP 20 unauthorizedly taken out of a specified place, namely the inside of the company, and reduction in occurrence of the unauthorized use of the MFP 20.

Even when the MFP 20 is disconnected from the LAN 11 during the time period that does not overlap at all with the specific time period when the MFP 20 is highly likely to be unauthorizedly used, namely during the time period when the MFP 20 is less likely to be unauthorizedly used (YES at Step S103, YES at Step S105, and NO at Step S110), the device management apparatus 30 does not notify the unauthorized use of the MFP 20. For example even when the MFP 20 is temporarily disconnected from the LAN 11 by some reason during business hours of any of the user of the MFP 20 and the print counter value of the MFP 20 is changed during this time period of disconnection, the device management apparatus 30 does not notify the unauthorized use of the MFP 20. Therefore, the device management apparatus 30 ensures reduction in occurrence of a false notification of the unauthorized use of the MFP 20.

Since the device management apparatus 30 operates with use of the schedule controlled in the external schedule management system, the schedule of the user of the MFP 20 is not necessary to be input exclusively for the device management apparatus 30, and this ensures enhancement of convenience.

Furthermore, in the device management apparatus 30, the schedule of the user of the MFP 20 may be input exclusively for the device management apparatus 30, without the device management apparatus 30 being in cooperation with the external schedule management system.

Additionally, when the reconnection of the MFP 20 to the LAN 11 is detected (YES at Step S103 and YES at Step S105) and the print counter value of the MFP 20 is changed during the time period of the disconnection of the MFP 20 from the LAN 11 (NO at Step S109), the device management apparatus 30 may notify the unauthorized use of the MFP 20 (Step S111) even when the time period of the disconnection of the MFP 20 from the LAN 11 does not overlap at all with the specific time period.

Since the device management apparatus 30 notifies the disconnection of the MFP 20 from the LAN 11 (Step S102) when the MFP 20 is disconnected from the LAN 11 during the specific time period having a high possibility of the unauthorized use of the MFP 20 (YES at Step S101), the device management apparatus 30 ensures prevention of the MFP 20 from being unauthorizedly taken out of the specified place, namely the inside of the company. Accordingly, the device management apparatus 30 ensures reduction in occurrence of the unauthorized use of the MFP 20.

Furthermore, the device management apparatus 30 uses the print counter value as the usage log of the MFP 20. However, the device management apparatus 30 can use a value other than the print counter value as the usage log. For example, the device management apparatus 30 can use at least one value among the print counter value of the MFP 20, a count of scanning of the MFP 20, and a remaining amount of toner of the MFP 20 as the usage log.

The device management apparatus 30 employs e-mail as a notification method in the embodiment, but may employ methods other than e-mail.

The electronic device of the disclosure is the MFP 20 in the embodiment, but it may be an image forming apparatus other than the MFP 20, such as a printer-only machine, a copy-only machine, a FAX-only machine, and a scanner-only machine, and may be the electronic device other than the image forming apparatus, such as a PC.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device management apparatus for notifying unauthorized use of an electronic device, comprising:
   a network communication circuit that communicates with the electronic device via a specific network;
   a connection status detecting circuit that detects, via the network communication circuit, a connection status of the electronic device to the specific network;
   a usage log acquiring circuit that acquires a usage log as at least one of a usage count and a usage amount of the electronic device; and
   a notification circuit that notifies an unauthorized use of the electronic device,
   wherein the notification circuit notifies the unauthorized use if the usage logs acquired by the usage log acquiring circuit before and after a time period of disconnection of the electronic device from the specific network are varied when a reconnection of the electronic device to the specific network is detected by the connection status detecting circuit after detecting the disconnection by the connection status detecting circuit,
   wherein the notification circuit notifies the unauthorized use only if the time period of disconnection overlaps with at least a part of a specific time period, and
   wherein the specific time period is a time period that includes company holidays and a time slot of out-of-business hours for a user of the electronic device based on a schedule obtained from a schedule management system for controlling the schedule of the user.

2. The device management apparatus according to claim 1,
   wherein the notification circuit notifies the disconnection of the electronic device from the specific network if the disconnection of the electronic device from the network during the specific time period is detected by the connection status detecting circuit.

3. The device management apparatus according to claim 1, further comprising
   a storage that stores a usage log database including the usage log of the electronic device and a connection log database including a connection log of the electronic device,
   wherein if the connection status detecting circuit determines that the connection log of the electronic device, the connection status of which is changed from the disconnection to connection, is included in the usage log database,
      the connection status detecting circuit detects the connection as the reconnection of the electronic device to the specific network,
      the usage log acquiring circuit determines whether or not the usage log in the usage log database and the acquired usage log after reconnecting the electronic device are identical, and
      the notification circuit notifies the unauthorized use when the usage log acquiring circuit determines that the usage log in the usage log database and the acquired usage log are not identical to each other.

4. The device management apparatus according to claim 3,
   wherein the usage log acquiring circuit overwrites the usage log in the usage log database with the acquired usage log after reconnecting the electronic device when the usage log acquiring circuit determines that the usage log in the usage log database and the acquired usage log are not identical to each other.

5. The device management apparatus according to claim 4,
   wherein if the connection status detecting circuit determines that the connection log of the electronic device the connection status of which is changed from the disconnection to connection is not included in the usage log database,
      the connection status detecting circuit detects the connection as the new connection of the electronic device to the specific network,
      the usage log acquiring circuit adds a combination of the usage log that is acquired after newly connecting the electronic device and the electronic device, into the usage log database, and
      the notification circuit avoids to notify the unauthorized use.

6. A non-transitory computer-readable recording medium storing a control program to control a device management apparatus for notifying unauthorized use of an electronic device, the control program causing the device management apparatus to function as:
   a network communication circuit that communicates with the electronic device via a specific network;
   a connection status detecting circuit that detects, via the network communication circuit, a connection status of the electronic device to the specific network;
   a usage log acquiring circuit that acquires a usage log as at least one of a usage count and a usage amount of the electronic device; and
   a notification circuit that notifies an unauthorized use of the electronic device,
   wherein the notification circuit notifies the unauthorized use if the usage logs acquired by the usage log acquiring circuit before and after a time period of disconnection of the electronic device from the specific network are varied when a reconnection of the electronic device to the specific network being detected by the connection status detecting circuit after detecting the disconnection by the connection status detecting circuit,
   wherein the notification circuit notifies the unauthorized use only if the time period of disconnection overlaps with at least a part of a specific time period, and
   wherein the specific time period is a time period that includes company holidays and a time slot of out-of-business hours for a user of the electronic device based on a schedule obtained from a schedule management system for controlling the schedule of the user.

7. The non-transitory computer-readable recording medium according to claim 6,
   wherein the notification circuit notifies the disconnection of the electronic device from the specific network if the disconnection of the electronic device from the network during the specific time period is detected by the connection status detecting circuit.

8. The non-transitory computer-readable recording medium according to claim 6, wherein the device management apparatus includes a storage that stores a usage log database including the usage log of the electronic device and a connection log database including a connection log of the electronic device, wherein if the connection status detecting circuit determines that the connection log of the electronic device, the connection status of which is changed from the disconnection to connection, is included in the usage log database, the connection status detecting circuit detects the connection as the reconnection of the electronic device to the specific network, the usage log acquiring circuit determines whether or not the usage log in the usage log database and the acquired usage log after reconnecting the electronic device are identical, and the notification circuit notifies the unauthorized use when the usage log acquiring circuit determines that the usage log in the usage log database and the acquired usage log are not identical each other.

9. The non-transitory computer-readable recording medium according to claim 8, the usage log acquiring circuit overwrites the usage log in the usage log database with the acquired usage log after reconnecting the electronic device when the usage log acquiring circuit determines that the usage log in the usage log database and the acquired usage log are not identical each other.

10. The non-transitory computer-readable recording medium according to claim 9, wherein if the connection status detecting circuit determines that the connection log of the electronic device, the connection status of which is changed from the disconnection to connection, is not included in the usage log database, the connection status detecting circuit detects the connection as the new connection of the electronic device to the specific network, the usage log acquiring circuit adds a combination of the usage log that is acquired after newly connecting the electronic device and the electronic device, into the usage log database, and the notification circuit avoids to notify the unauthorized use.

11. A device management method of notifying unauthorized use of an electronic device, comprising:

communicating, by a processor of a device management apparatus, with the electronic device via a specific network;

detecting, by the processor, a connection status of the electronic device to the specific network;

acquiring, by the processor, a usage log as at least one of a usage count and a usage amount of the electronic device; and notifying, by the processor, an unauthorized use of the electronic device, wherein the notifying notifies the unauthorized use if the usage logs acquired by the acquiring before and after a time period of disconnection of the electronic device from the specific network are varied when a reconnection of the electronic device to the specific network is detected by the detecting after detecting the disconnection as the connection status, wherein the notifying notifies the unauthorized use only if the time period of disconnection overlaps with at least a part of a specific time period, and wherein the specific time period is a time period that includes company holidays and a time slot of out-of-business hours for a user of the electronic device based on a schedule obtained from a schedule management system for controlling the schedule of the user.

12. The device management method according to claim 11, wherein the notifying notifies the disconnection of the electronic device from the specific network if the disconnection of the electronic device from the network during the specific time period is detected by the connection status detecting circuit.

13. The device management method according to claim 11, comprising:

storing, in a storage, a usage log database including the usage log of the electronic device and a connection log database including a connection log of the electronic device, wherein if the detecting determines that the connection log of the electronic device, the connection status of which is changed from the disconnection to connection, is included in the usage log database, the detecting detects the connection as the reconnection of the electronic device to the specific network, the acquiring determines whether or not the usage log in the usage log database and the acquired usage log after reconnecting the electronic device are identical, and the notifying notifies the unauthorized use when the usage log acquiring circuit determines that the usage log in the usage log database and the acquired usage log are not identical each other.

14. The device management method according to claim 13, wherein the acquiring overwrites the usage log in the usage log database with the acquired usage log after reconnecting the electronic device when the acquiring determines that the usage log in the usage log database and the acquired usage log are not identical to each other.

15. The device management method according to claim 14, wherein if the detecting determines that the connection log of the electronic device, the connection status of which is changed from the disconnection to connection, is not included in the usage log database, the detecting detects the connection as the new connection of the electronic device to the specific network, the acquiring adds a combination of the usage log that is acquired after newly connecting the electronic device and the electronic device, into the usage log database, and the notifying avoids to notify the unauthorized use.

* * * * *